US012648889B2

(12) United States Patent
Feng et al.

(10) Patent No.: US 12,648,889 B2
(45) Date of Patent: Jun. 9, 2026

(54) PORTABLE UPPER LIMB REHABILITATION MECHANICAL ARM WITH GRADING ADJUSTMENT TRAINING FUNCTION

(71) Applicant: Jilin University, Changchun City (CN)

(72) Inventors: Mei Feng, Changchun City (CN); Yanlei Gong, Changchun City (CN); Xingze Jin, Changchun City (CN); Xiuquan Lu, Changchun City (CN); Shijie Liu, Changchun City (CN); Yongkang Li, Changchun City (CN); Hengyue Su, Changchun City (CN)

(73) Assignee: JILIN UNIVERSITY, Changchun City (CN)

(*) Notice: Subject to any disclaimer, the term of this patent is extended or adjusted under 35 U.S.C. 154(b) by 974 days.

(21) Appl. No.: 17/885,179

(22) Filed: Aug. 10, 2022

(65) Prior Publication Data

US 2023/0050111 A1 Feb. 16, 2023

(30) Foreign Application Priority Data

Aug. 12, 2021 (CN) ......................... 202110925886.0

(51) Int. Cl.

*A61H 1/02* (2006.01)
*A61H 23/02* (2006.01)

(52) U.S. Cl.

CPC ......... *A61H 1/0277* (2013.01); *A61H 1/0285* (2013.01); *A61H 1/0288* (2013.01);
(Continued)

(58) Field of Classification Search

CPC .. A61H 1/0277; A61H 1/0285; A61H 1/0288; A61H 1/0274; A61H 23/02;
(Continued)

(56) References Cited

U.S. PATENT DOCUMENTS

| | | | | |
|---|---|---|---|---|
| 4,817,588 A * | 4/1989 | Bledsoe | A61F 5/0125 | 602/16 |
| 2013/0060171 A1* | 3/2013 | Fu | A61H 1/00 | 601/5 |
| 2019/0365554 A1* | 12/2019 | Davies-Sekle | A61H 1/0281 | |

FOREIGN PATENT DOCUMENTS

| | | | |
|---|---|---|---|
| CN | 202027877 U | 11/2011 | |
| CN | 107307974 A * | 11/2017 | A61H 1/0277 |

(Continued)

*Primary Examiner* — Tu A Vo
*Assistant Examiner* — Kelsey E Baller
(74) *Attorney, Agent, or Firm* — DITTHAVONG, STEINER & MLOTKOWSKI

(57) ABSTRACT

A portable upper limb rehabilitation mechanical arm with a grading adjustment training function comprises a big arm component, a supporting component, a grading adjustment component, a small arm component, a wrist component and a hand component, wherein the big arm component comprises a big arm shell, a big arm back plate, a first big arm support and a second big arm support; the supporting component comprises a supporting base, an inner supporting rod, an outer supporting rod, a sealing piece, a reversing component and a connecting bolt group; the grading adjustment component comprises an elbow motor shell, an elbow joint motor and an adjusting component; the small arm component comprises a first small arm support, a second small arm support, a small arm back plate and a small arm shell.

9 Claims, 7 Drawing Sheets

(52) U.S. Cl.
CPC ..... *A61H 23/02* (2013.01); *A61H 2201/0157* (2013.01); *A61H 2201/0192* (2013.01); *A61H 2201/1207* (2013.01); *A61H 2201/14* (2013.01); *A61H 2201/1635* (2013.01); *A61H 2205/065* (2013.01); *A61H 2205/067* (2013.01)

(58) Field of Classification Search
CPC .... A61H 2201/0157; A61H 2201/0192; A61H 2201/1207; A61H 2201/14; A61H 2201/1635; A61H 2201/1638; A61H 2205/065; A61H 2205/067; A61H 2205/06; A61H 3/00; B25J 9/0006
See application file for complete search history.

(56) References Cited

FOREIGN PATENT DOCUMENTS

| | | | | | |
|---|---|---|---|---|---|
| CN | 107961107 | A | * | 4/2018 | ............... A61F 5/05 |
| CN | 109350446 | A | | 2/2019 | |
| CN | 111110509 | A | | 5/2020 | |
| CN | 210500265 | U | | 5/2020 | |
| WO | WO-2018093448 | A2 | * | 5/2018 | ........... A61H 1/0285 |

* cited by examiner

PORTABLE UPPER LIMB REHABILITATION MECHANICAL ARM WITH GRADING ADJUSTMENT TRAINING FUNCTION

CROSS REFERENCE TO RELATED APPLICATION

This patent application claims the benefit and priority of Chinese Patent Application No. 202110925886.0, filed on Aug. 12, 2021, the disclosure of which is incorporated by reference herein in its entirety as part of the present application.

TECHNICAL FIELD

The present disclosure relates to the technical field of rehabilitation therapy instruments, and particularly relates to a portable upper limb rehabilitation mechanical arm with a grading adjustment training function.

BACKGROUND ART

With the improvement of living standards, the health problem is more and more paid attention to people. Investigations show that cerebral apoplexy becomes one of the most major diseases harming the health and even life of people in China, and develops towards the trend of young people. The cerebral apoplexy has the characteristics of high morbidity, high death rate and high disability rate, and patients often need to undergo long-time rehabilitation training in the rehabilitation period so as to reduce the risk of disability.

At present, a traditional treatment method is that patients need one-to-one rehabilitation training by professional doctors, and training modes are continuously adjusted according to the conditions of the patients. However, the training intensity is high, the process is tedious, and physical and mental burdens are easily generated on the doctors and the patients, so that some patients choose to abandon treatment and delay the illness states. With rapid development of society, medical instruments are used for rehabilitation training of the patients to gradually replace traditional treatment means, but most of existing upper limb rehabilitation instruments do not have the function of adjusting the training mode and are single in function, and only a certain part of the patient can be trained. Some mechanical arms with active movement functions usually need external driving, transmission and fixed equipment, and therefore the mechanical arms are large in size, high in manufacturing cost, difficult to carry and unsuitable for household rehabilitation training.

The patent CN111110509 A discloses an interchangeable and common seven-degree-of-freedom upper limb exoskeleton robot. The upper limb exoskeleton has three training modes, can carry out seven-degree-of-freedom training on the upper limbs of a patient in different rehabilitation stages, is high in practicability and can be used for medical institutions. However, the purchase cost is increased due to the fact that a movable seat needs to be arranged, and therefore the upper limb exoskeleton robot is unsuitable for home training. The patent CN210500265U discloses a foldable upper limb exoskeleton device. The upper limb exoskeleton is ingenious in structure and convenient to carry, but the structure of the upper limb exoskeleton does not have an active movement function and is unsuitable for upper limb rehabilitation training of the patient. The patent CN202027877U discloses a wearable seven-degree-of-freedom upper limb exercise rehabilitation training exoskeleton. The upper limb exoskeleton has multiple degrees of freedom and is provided with a sensor for acquiring kinematic data, so that a doctor can analyze and formulate a training scheme conveniently, but the structure of the exoskeleton needs to be fixed by a base and is large in size and inconvenient to move. In addition, the structure is driven by gears, so that the working noise is large, and the hand rehabilitation training function is not achieved. The patent CN109350446A discloses an active and passive combined upper limb rehabilitation training robot system based on electromyographic signals. The upper limb rehabilitation training robot system can collect electromyographic signals of the patient and make a corresponding training scheme, but the structure needs to be provided with an upper computer and a movable base, the size is large, the use cost is increased, and a wrist and hand training function is not provided.

SUMMARY

The present disclosure aims to provide a portable upper limb rehabilitation mechanical arm with a grading adjustment training function so as to solve the problems in the prior art. The mechanical arm is small in size, foldable, convenient to carry, low in noise, low in cost and high in safety, and is suitable for rehabilitation training of arms, elbows, wrists and hands of patients in different rehabilitation periods in different environments.

In order to achieve the purpose, the present disclosure provides the following scheme: the present disclosure provides a portable upper limb rehabilitation mechanical arm with a grading adjustment training function. The portable upper limb rehabilitation mechanical arm comprises a big arm component, a supporting component, a grading adjustment component, a small arm component, a wrist component and a hand component;

- the big arm component comprises a big arm shell, a big arm back plate, a first big arm support and a second big arm support; the first big arm support and the second big arm support are respectively connected with the big arm back plate through bolts; the big arm shell is connected with the big arm back plate through bolts; an arc-shaped groove is formed in the big arm back plate;
- the supporting component comprises a supporting base, an inner supporting rod, an outer supporting rod, a sealing piece, a reversing component and a connecting bolt group; the reversing component comprises a cover plate, a ratchet wheel, a ratchet, a reset spring and a button; the reversing component is mounted on the supporting base and sealed through the cover plate; the inner supporting rod and the outer supporting rod are coaxially assembled and connected; the inner supporting rod is connected with the ratchet wheel; the inner supporting rod and the outer supporting rod can be accommodated in the supporting base and sealed through the sealing piece; the supporting component is fixed on the big arm back plate through the connecting bolt group; the first big arm support and the second big arm support are respectively fixedly connected with the supporting base through screws;
- the grading adjustment component comprises an elbow motor shell, an elbow joint motor and an adjusting component; the adjusting mechanism comprises a knob cap, a knob spring, an adjusting knob, a wire plate, a wire plate cover plate and an upper limited block; the elbow motor shell is fixed on the big arm back plate through bolts; the wire plate is fixed on the big arm back plate through the wire plate cover plate; six same through holes are respectively formed in the wire plate and the wire plate cover plate; one end of the adjusting knob penetrates through the through holes, and the other end of the adjusting knob penetrates through the arc-shaped groove in the big arm back plate and is in threaded connection with the knob cap; the knob spring is mounted on the adjusting knob;

the small arm component comprises a first small arm support, a second small arm support, a small arm back plate and a small arm shell; the first small arm support and the second small arm support are respectively connected with the small arm back plate through bolts; the small arm shell is connected with the small arm back plate through bolts; the grading adjustment component is connected with the big arm component and the small arm component;

the wrist component comprises a first wrist joint motor, a second wrist joint motor, a first wrist motor shell, a second wrist motor shell, a first wrist supporting plate and a second wrist supporting plate; the first wrist joint motor is connected with the small arm back plate and the first wrist supporting plate, and the first wrist motor shell is fixed on the first wrist supporting plate through bolts; the second wrist joint motor is connected with the first wrist supporting plate and the second wrist supporting plate, the second wrist motor shell is fixed on the second wrist supporting plate through bolts, and the second wrist supporting plate is connected with the hand component;

the hand component comprises a palm pad and joint vibration components; the palm pad is provided with a hand binding band; the joint vibration component comprises a finger binding band, a microvibration unit and a plug; and the microvibration unit is fixed on the finger binding band and sealed through the plug.

Preferably, the relative rotation range of the big arm component and the small arm component is 0° to 180°.

Preferably, two fixed holes used for hanging the mechanical arm are formed in the upper portion of the big arm back plate.

Preferably, the big arm shell and the small arm shell are both hollow shells.

Preferably, the inner supporting rod can be locked unidirectionally through the ratchet wheel, a square hole connected with the ratchet wheel is formed in one end of the inner supporting rod, and a pressing shrinkage structure is arranged at the other end of the inner supporting rod.

Preferably, the outer supporting rod is in a hollow pipe shape, six pairs of fixed through holes which are evenly distributed are symmetrically formed in the side wall of the outer supporting rod, and an anti-skid sheath is arranged at the tail end of the outer supporting rod.

Preferably, grooves for accommodating the inner supporting rod and the outer supporting rod and mounting the reversing component is formed in the supporting base.

Preferably, the first big arm support, the second big arm support, the first small arm support, the second small arm support, the hand binding band and the finger binding band are all made of hook and loop fasteners.

Preferably, the surface of the elbow motor shell is provided with character identifiers for displaying gears where the adjusting knob is located.

Compared with the prior art, the present disclosure has the following beneficial technical effects.

Firstly, according to the upper limb rehabilitation mechanical arm, the big arm component and the small arm component can be placed in a retractable mode and are convenient to carry.

Secondly, according to the upper limb rehabilitation mechanical arm, the supporting height and angle can be adjusted through the inner supporting rod and the outer supporting rod, extra bases, supports and the like are not needed, the mounting space is saved, the cost is reduced, and the economic burden of a patient can be relieved.

Thirdly, the upper limb rehabilitation mechanical arm is directly driven by joint motors and is free of intermediate links such as gear transmission and belt transmission, so that the equipment size is reduced, the noise is reduced, the psychological burden of the patient when the patient uses the equipment can be reduced, and the comfort is improved.

Fourthly, the upper limb rehabilitation mechanical arm has a grading adjustment function, can adjust the movement angle between the big arm and the small arm, and is suitable for rehabilitation training of patients with different illness states in different rehabilitation periods.

Fifthly, the upper limb rehabilitation mechanical arm is mechanically limited, so that the safety is improved.

Sixthly, the upper limb rehabilitation mechanical arm is suitable for standing postures, sitting postures and lying postures of the patient, so that the environmental adaptability can be improved, and the use experience of the patient is improved.

Seventhly, the hand part of the upper limb rehabilitation mechanical arm is provided with vibration components which correspond to finger joints, so that nerves of the patient can be activated through vibration.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

Reference signs: 1, big arm component; 2, supporting component; 3, grading adjustment component; 4, small arm component; 5, wrist component; 6, hand component; 11, big arm shell; 12, big arm back plate; 121, arc-shaped groove; 122, fixed hole; 13, first big arm support; 14, second big arm support; 21, supporting base; 22, inner supporting rod; 221, square hole; 222, pressing shrinkage structure; 2221, steel ball; 2222, pressing spring; 23, outer supporting rod; 231, antiskid sheath; 232, fixed through hole; 24, sealing piece; 25, reversing component; 251, cover plate; 252, ratchet wheel; 253, ratchet; 254, reset spring; 255, button; 26, connecting bolt group; 31, elbow motor shell; 32, elbow joint motor; 33, adjusting mechanism; 331, knob cap; 332, knob spring; 333, adjusting knob; 334, wire plate; 335, wire plate cover plate; 3361, through hole; 337, upper limited block; 41, first small arm support; 42, second small arm support; 43, small arm back plate; 431, bulge; 44, small arm shell; 51, first wrist joint motor; 52, second wrist joint motor; 53, first wrist motor shell; 54, second wrist motor shell; 55, first wrist supporting plate; 56, second wrist supporting plate; 61, palm pad; 611, hand binding band; 62, vibration component; 621, finger binding band; 622, microvibration unit; and 623, plug.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

The present disclosure aims to provide a portable upper limb rehabilitation mechanical arm with a grading adjustment training function so as to solve the problems in the prior art. The mechanical arm is small in size, foldable, convenient to carry, low in noise, low in cost and high in safety, and is suitable for rehabilitation training of arms, elbows, wrists and hands of patients in different rehabilitation periods in different environments.

To make the foregoing objective, features and advantages of the present disclosure clearer and more comprehensible, the present disclosure is further described in detail below with reference to the attached figures and specific embodiments.

Figure 1:
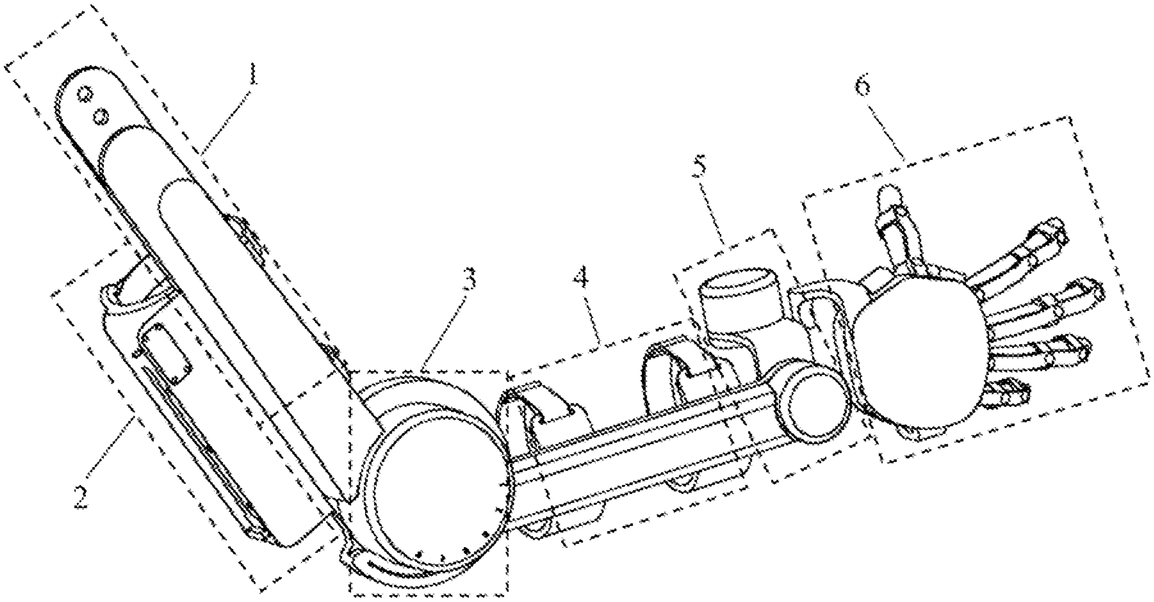
FIG. 1 is an overall structural schematic diagram of a mechanical arm in the present disclosure.
Figure 2:
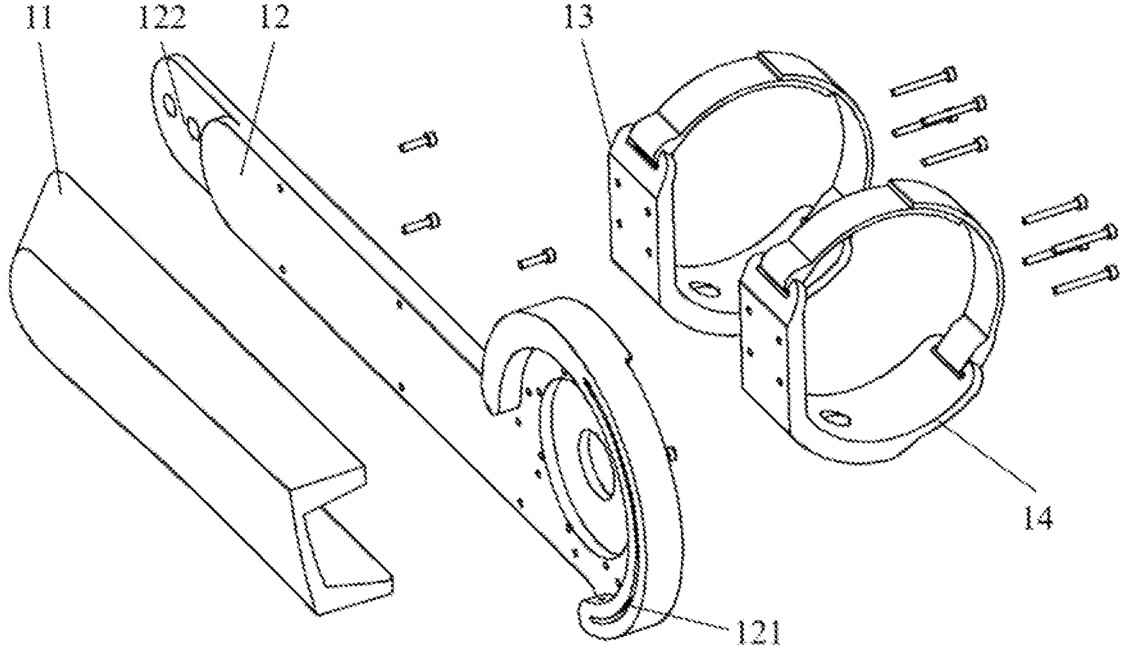
FIG. 2 is an explosive schematic diagram of a big arm component in the present disclosure.
Figure 3:
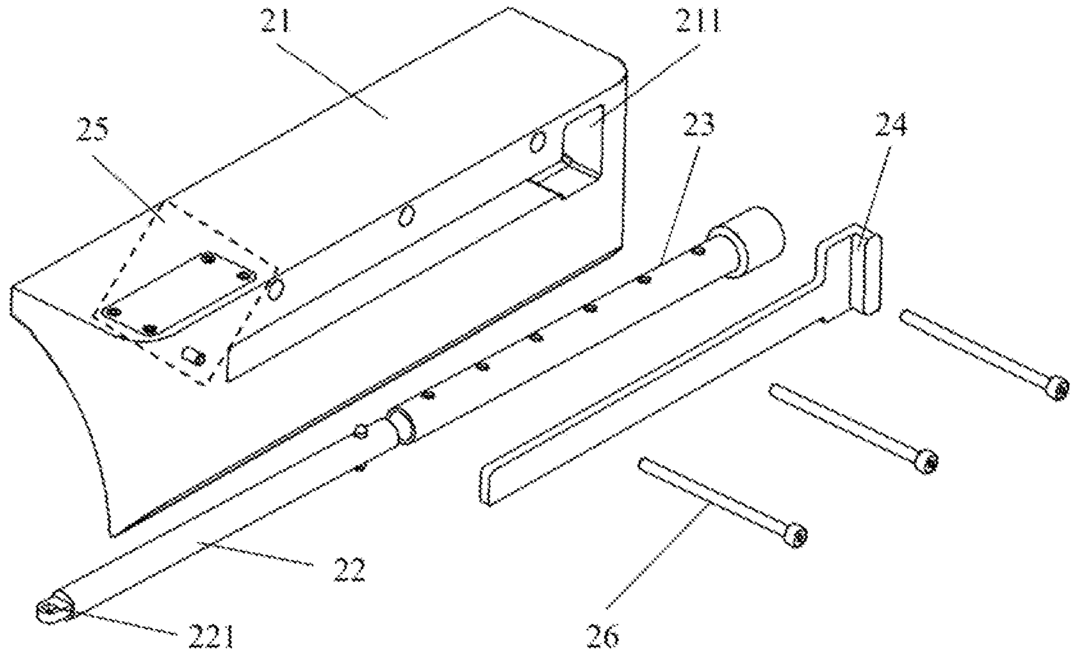
FIG. 3 is a structural explosive view of a supporting component in the present disclosure.
Figure 4:
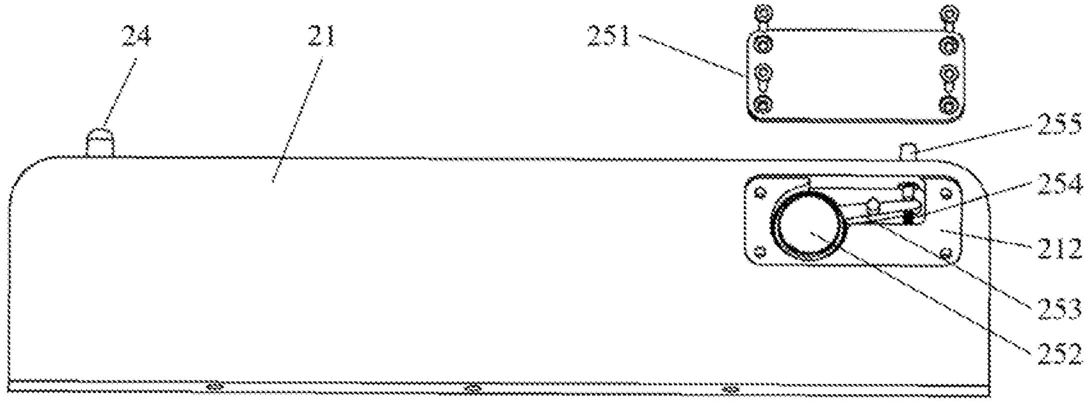
FIG. 4 is a structural schematic diagram of a reversing component in the present disclosure.
Figure 5:
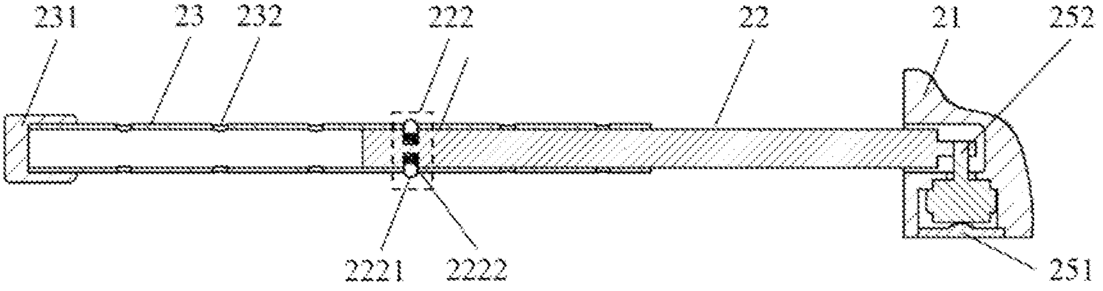
FIG. 5 is an assembly relationship schematic diagram of supporting rods in the present disclosure.
Figure 6:
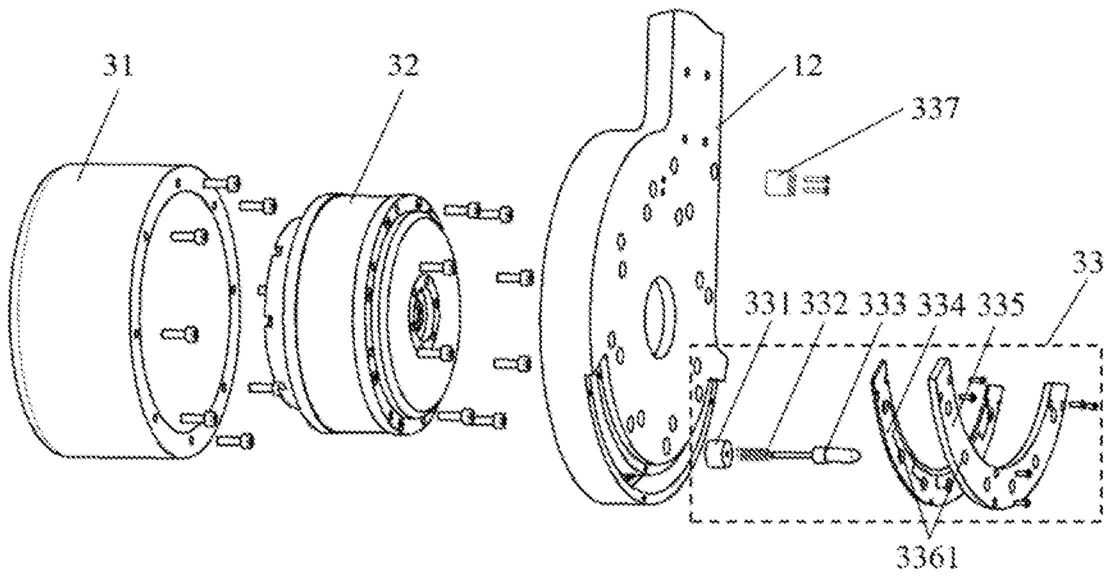
FIG. 6 is an explosive schematic diagram of a grading adjustment component in the present disclosure.
Figure 7:
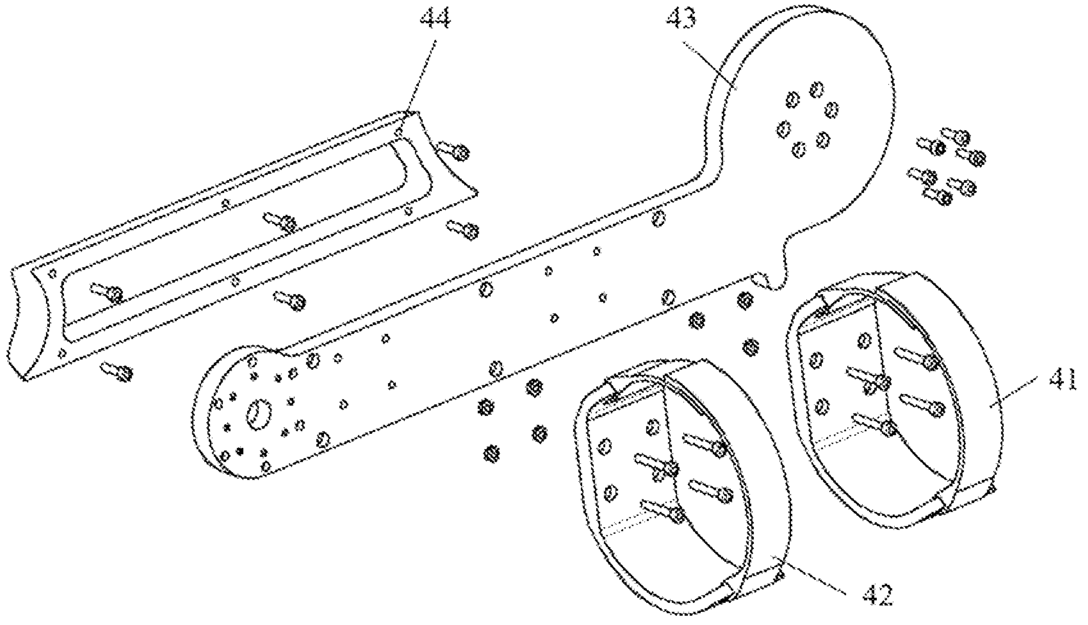
FIG. 7 is an explosive schematic diagram of a small arm component in the present disclosure.
Figure 8:
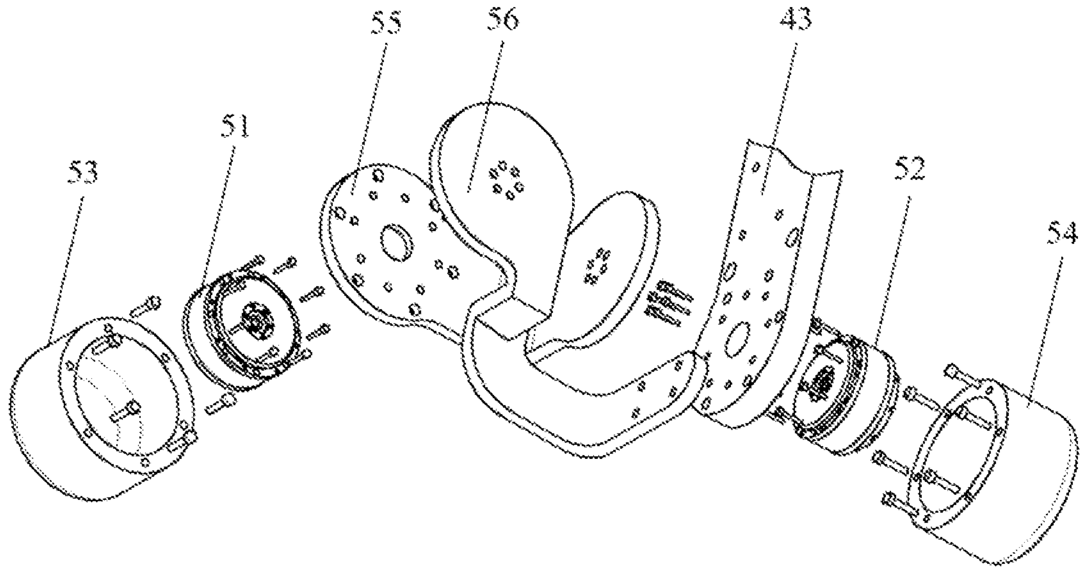
FIG. 8 is an explosive schematic diagram of a wrist component in the present disclosure.
Figure 9:
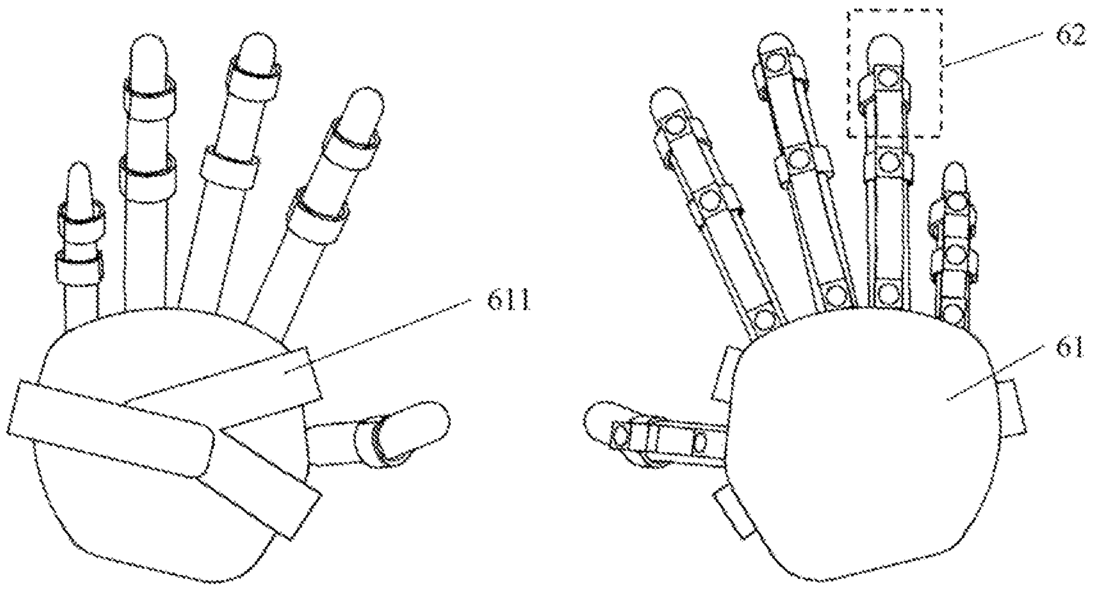
FIG. 9 is a structural schematic diagram of a hand component in the present disclosure.
Figure 10:
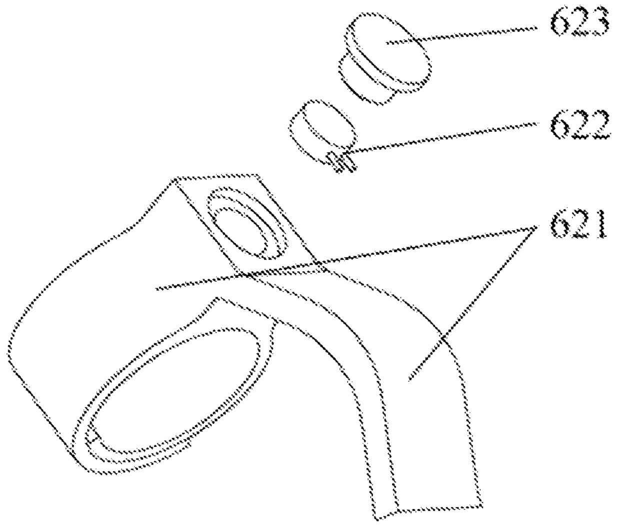
FIG. 10 is an explosive schematic diagram of a vibration component in the present disclosure.
Figure 11:
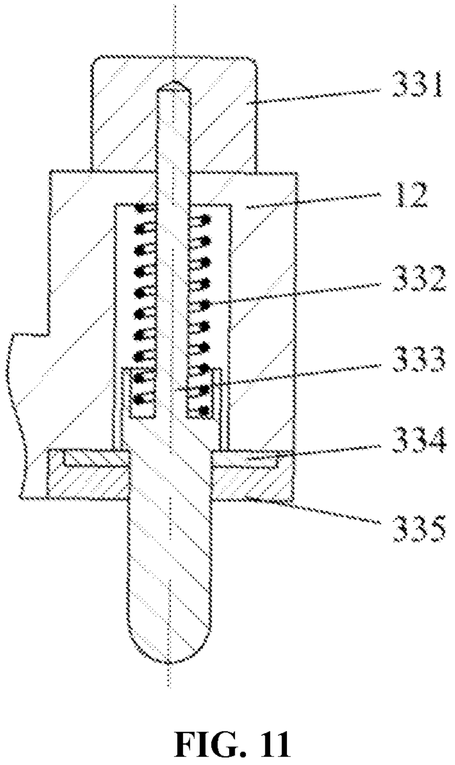
FIG. 11 is a part sectioned view for mounting an adjusting knob in the present disclosure.
Figure 12:
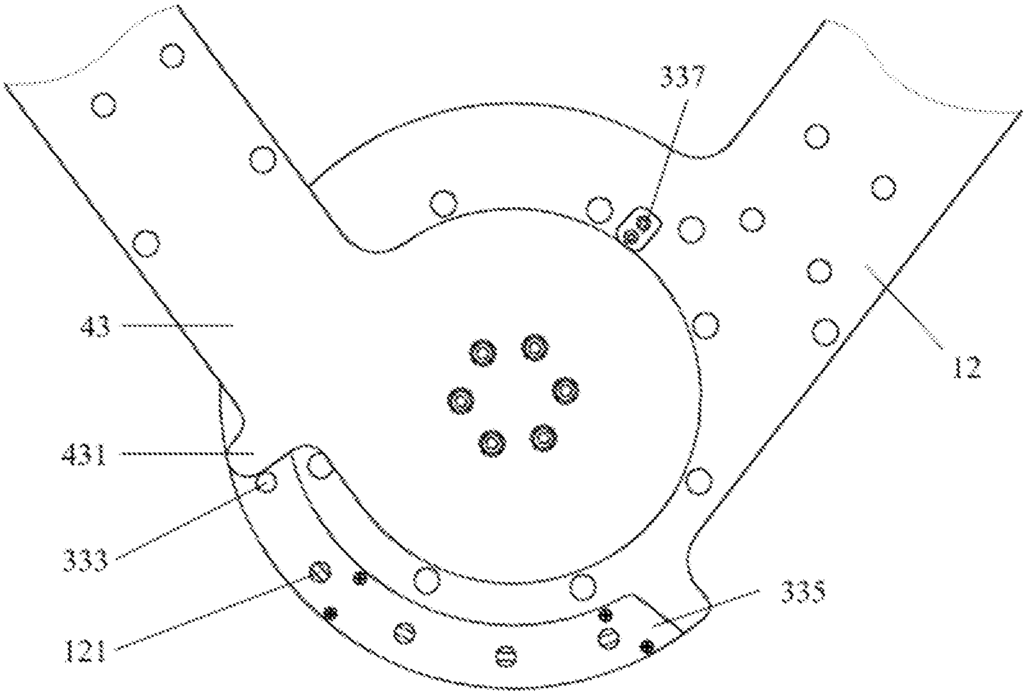
FIG. 12 is a schematic diagram of a limited structure in the present disclosure.
Figure 13:
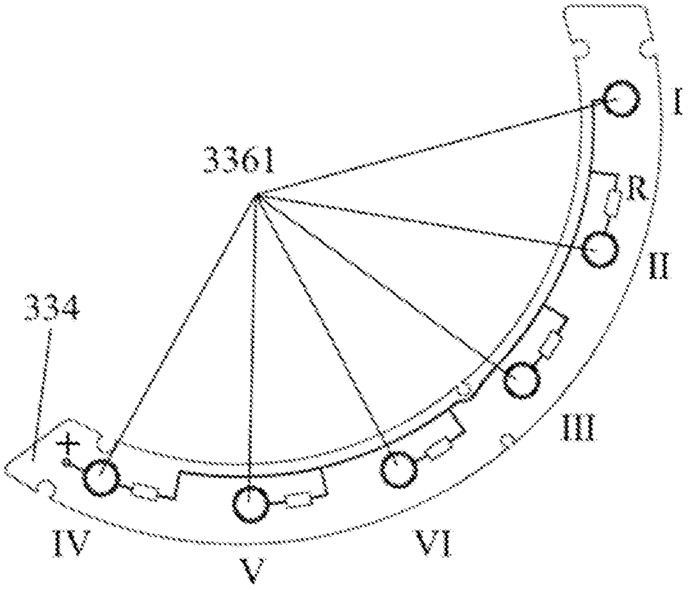
FIG. 13 is a structural schematic diagram of a wire plate in the present disclosure.
Figure 14:
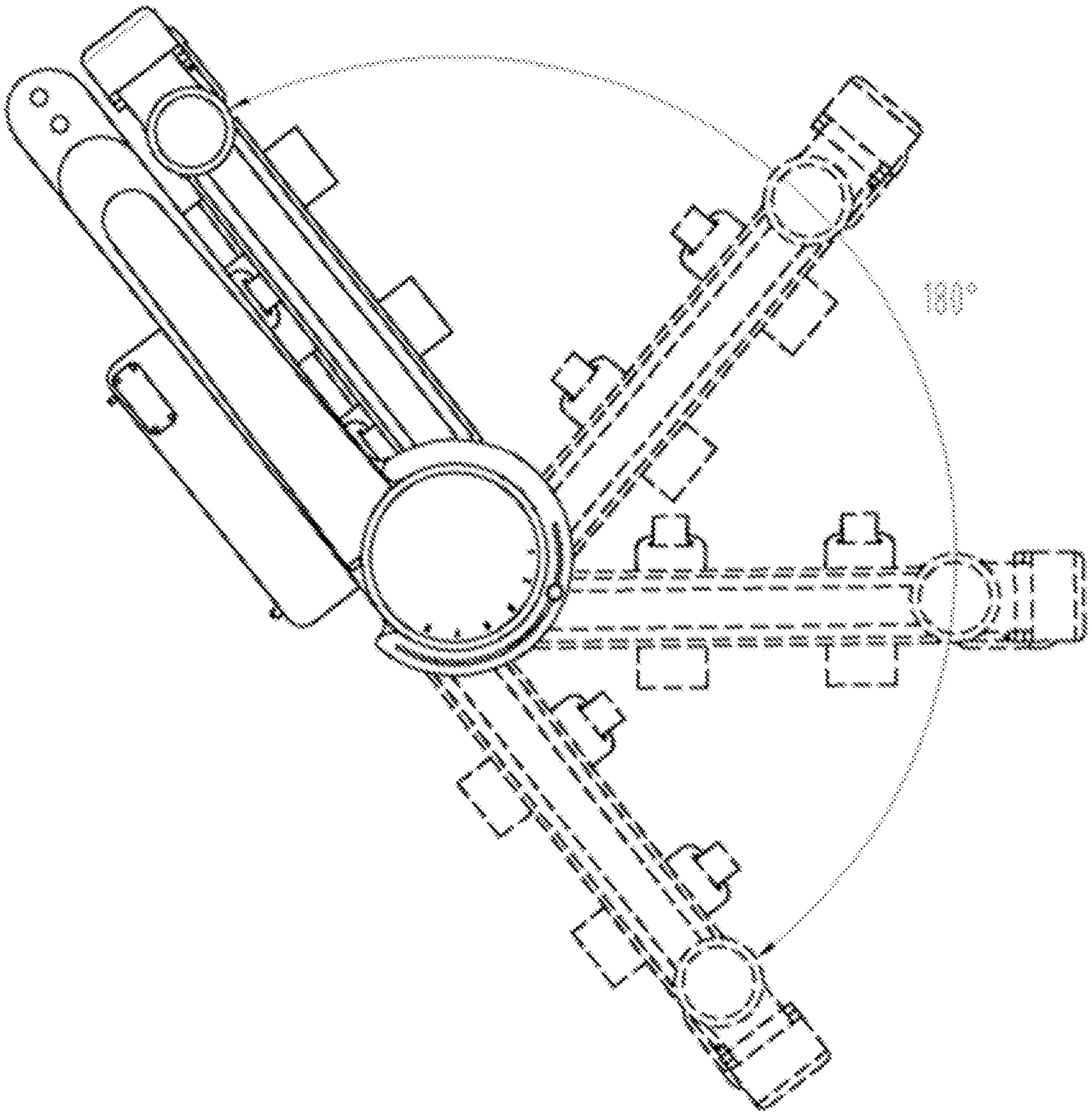
FIG. 14 is a shrinkage and unfolding schematic diagram of a big arm component and a small arm component in the present disclosure.

As shown in FIG. 1 to FIG. 14, the embodiment provides an upper limb rehabilitation mechanical arm with a grading adjustment training function. The upper limb rehabilitation mechanical arm comprises a big arm component 1, a supporting component 2, a grading adjustment component 3, a small arm component 4, a wrist component 5 and a hand component 6;

the big arm component 1 comprises a big arm shell 11, a big arm back plate 12, a first big arm support 13 and a second big arm support 14; the first big arm support 13 and the second big arm support 14 are respectively connected with the big arm back plate 12 through bolts; the big arm shell 11 is connected with the big arm back plate 12 through bolts; an arc-shaped groove 1212 is formed in the big arm back plate 12;

the supporting component 2 comprises a supporting base 21, an inner supporting rod 22, an outer supporting rod 23, a sealing piece 24, a reversing component 25 and a connecting bolt group 16; the reversing component 25 comprises a cover plate 251, a ratchet wheel 252, a ratchet 253, a reset spring 254 and a button 255; the reversing component 25 is mounted on the supporting base 21 and sealed through the cover plate 251; the inner supporting rod 22 and the outer supporting rod 23 are coaxially assembled and connected; the inner supporting rod 22 is connected with the ratchet wheel 252; the inner supporting rod 22 and the outer supporting rod 23 can be accommodated in the supporting base 21 and sealed through the sealing piece 24; the supporting component 2 is fixed on the big arm back plate 12 through the connecting bolt group 26; the first big arm support 13 and the second big arm support 14 are respectively fixedly connected with the supporting base 21 through screws;

the grading adjustment component 3 comprises an elbow motor shell 31, an elbow joint motor 32 and an adjusting component 33; the adjusting mechanism 33 comprises a knob cap 331, a knob spring 332, an adjusting knob 333, a wire plate 334, a wire plate cover plate 335 and an upper limited block 337; the elbow motor shell 31 is fixed on the big arm back plate 12 through bolts; the wire plate 334 is fixed on the big arm back plate 12 through the wire plate cover plate 335; six same through holes 3361 are respectively formed in the wire plate 334 and the wire plate cover plate 335; one end of the adjusting knob 333 penetrates through the through hole 3361, and the other end of the adjusting knob penetrates through the arc-shaped groove 121 in the big arm back plate 12 and is in threaded connection with the knob cap 331; the knob spring 332 is mounted on the adjusting knob 333;

the small arm component 4 comprises a first small arm support 41, a second small arm support 42, a small arm back plate 43 and a small arm shell 44; the first small arm support 41 and the second small arm support 42 are respectively connected with the small arm back plate 43 through bolts; the small arm shell 44 is connected with the small arm back plate 43 through bolts; the grading adjustment component 3 is connected with the big arm component 1 and the small arm component 4;

the wrist component 5 comprises a first wrist joint motor 51, a second wrist joint motor 52, a first wrist motor shell 53, a second wrist motor shell 54, a first wrist supporting plate 55 and a second wrist supporting plate 56; the first wrist joint motor 51 is connected with the small arm back plate 43 and the first wrist supporting plate 55, and the first wrist motor shell 53 is fixed on the first wrist supporting plate 55 through bolts; the second wrist joint motor 52 is connected with the first wrist supporting plate 55 and the second wrist supporting plate 56, the second wrist motor shell 54 is fixed on the second wrist supporting plate 56 through bolts, and the second wrist supporting plate 56 is connected with the hand component 6;

the hand component 6 comprises a palm pad 61 and joint vibration components 62; the palm pad 61 is provided with a hand binding band 611; the joint vibration component comprises a finger binding band 621, a microvibration unit 622 and a plug 623; and the microvibration unit 622 is fixed on the finger binding band 621 and sealed through the plug 623.

In the embodiment, the relative rotation range of the big arm component 1 and the small arm component 4 is 0° to 180°, so that shrinkage placement can be achieved. Two fixed holes 122 used for hanging the mechanical arm are formed in the upper portion of the big arm back plate 12. The big arm shell 11 and the small arm shell 44 are both hollow shells. The inner supporting rod 22 can be locked unidirectionally through the ratchet wheel 252, a square hole 221 connected with the ratchet wheel 252 is formed in one end of the inner supporting rod 22, and a pressing shrinkage structure 222 is arranged at the other end of the inner supporting rod 22. The pressing shrinkage structure 222 consists of a steel ball 2221 and a pressing spring 2222. The outer supporting rod 23 is in a hollow pipe shape, six pairs of fixed through holes 232 which are evenly distributed are symmetrically formed in the side wall of the outer supporting rod 23, and an anti-skid sheath 231 is arranged at the tail end of the outer supporting rod 23. Grooves 211 and 212 for accommodating the inner supporting rod 22 and the outer supporting rod 23 and mounting the reversing component 25 are formed in the supporting base 21. The first big arm support 13, the second big arm support 14, the first small arm support 41, the second small arm support 42, the hand binding band 611 and the finger binding band 621 are all made of hook and loop fasteners. The adjusting knob 333 penetrates through the through holes 3361 in the wire plate 334 and the wire plate cover plate 335 to form mechanical limit. The six through holes 3361 in the wire plate 334 and the wire plate cover plate 335 form six gears. The surface of the elbow motor shell 31 is provided with character identifiers for displaying gears where the adjusting knob 333 is located. The number of the vibration components 62 corresponding to the finger joints is fourteen.

When the mechanical arm is used, the first big arm support 13 and the second big arm support 14 are fixed to a big arm of a human body, and the first small arm support 41 and the second small arm support 42 are fixed to a small arm of the human body. The sealing piece 24 is taken down. The button 255 is pressed down. The inner supporting rod 22 and the outer supporting rod 23 are screwed out of the groove 211 in the supporting base 21. The outer supporting rod 23 is pulled relative to the inner supporting rod 22, so that the steel ball 2221 extrudes the pressing spring 2222. When the steel ball 2221 reaches the position of the fixed through hole 232 in the outer supporting rod 23, the steel ball 2221 resets, the inner supporting rod 22 and the outer supporting rod 23 are fixed together through the pressing shrinkage structure 222, and the screw-out angle and the pulling distance are adjusted, so that the inner supporting rod 22 and the outer supporting rod 23 can support the big arm of the human body. The button 255 is loosened, the inner supporting rod 22 is locked, and the antiskid sheath 231 prevents the mechanical arm from sliding. The knob cap 331 is pulled, the adjusting knob 333 is pulled to be separated from the through hole 3361 in the wire plate 334, and the adjusting knob 333 is slid along the arc-shaped groove 121 in the big arm back plate 12. For example, when the adjusting knob 333 is adjusted to the third gear displayed on the surface of the elbow motor shell 31, the knob cap 331 is loosened. Under the action of the knob spring 332, the adjusting knob 333 is inserted into the through hole 3361, corresponding to the third gear, in the wire plate 334 again, and mechanical limit is formed. When the bulge 431 on the small arm back plate 43 makes contact with the adjustment knob 333, the downward movement of the small arm component 4 is limited. The adjusting knob 333 makes contact with the wire plate 334, and the resistance R of the elbow joint motor 32 is changed. The elbow joint motor 32 is controlled to rotate in the range of the third gear in a reciprocating mode through a preset control program. The upper limited block 337 limits the small arm component 4 to move upwards. In addition, soft limit can be performed through the control program. The hand component 6 is fixed to the second wrist supporting plate 56. The hand binding band 611 is fixed to the palm of the human body. The finger binding band 621 is fixed to the fingers of the human body respectively. The first wrist motor 51 rotates to drive the hand component 6, the second wrist motor 52 and the second wrist supporting plate 56 to rotate by multiple motions, so that inward rotation and outward rotation of the wrist are achieved. The second wrist motor 52 rotates to drive the hand component 6 to rotate, so that inversion and eversion of the wrist are realized. The vibration components 62 correspond to fourteen joints of fingers of the human body. Through vibration of the microvibration unit 622, the finger joints of the patient can be massaged, and the purpose of activating finger nerves and muscles is achieved.

It needs to be noted that for those skilled in the art, obviously the present disclosure is not limited to the details of the exemplary embodiment, and the present disclosure can be achieved in other specific forms without departing from the spirit or essential characteristics of the present disclosure. Therefore, for every point, the embodiments should be regarded as exemplary embodiments and are unrestrictive, the scope of the present disclosure is restricted by the claims appended hereto, therefore, all changes, including the meanings and scopes of equivalent elements, of the claims are aimed to be included in the present disclosure, and any mark of attached figures in the claims should not be regarded as limitation to the involved claims.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. A portable upper limb rehabilitation mechanical arm with a grading adjustment training function, comprising a big arm component, a supporting component, a grading adjustment component, a small arm component, a wrist component and a hand component, wherein the big arm component comprises a big arm shell, a big arm back plate, a first big arm support and a second big arm support; the first big arm support and the second big arm support are respectively connected with the big arm back plate through first bolts; the big arm shell is connected with the big arm back plate through second bolts; an arc-shaped groove is formed in the big arm back plate;

the supporting component comprises a supporting base, an inner supporting rod, an outer supporting rod, a sealing piece, a reversing component and a connecting bolt group; the reversing component comprises a cover plate, a ratchet wheel, a ratchet, a reset spring and a button; the reversing component is mounted on the supporting base and sealed through the cover plate; the inner supporting rod and the outer supporting rod are coaxially assembled and connected; the inner supporting rod is connected with the ratchet wheel; the inner supporting rod and the outer supporting rod are capable of being accommodated in the supporting base and sealed through the sealing piece; the supporting component is fixed on the big arm back plate through the connecting bolt group; the first big arm support and the second big arm support are respectively fixedly connected with the supporting base through screws;

the grading adjustment component comprises an elbow motor shell, an elbow joint motor and an adjusting component; the adjusting mechanism comprises a knob cap, a knob spring, an adjusting knob, a wire plate, a wire plate cover plate and an upper limited block; the elbow motor shell is fixed on the big arm back plate through third bolts; the wire plate is fixed on the big arm back plate through the wire plate cover plate; six same through holes are respectively formed in the wire plate and the wire plate cover plate; one end of the adjusting knob penetrates through the six same through holes, and the other end of the adjusting knob penetrates through the arc-shaped groove in the big arm back plate and is in threaded connection with the knob cap; the knob spring is mounted on the adjusting knob;

the small arm component comprises a first small arm support, a second small arm support, a small arm back plate and a small arm shell; the first small arm support and the second small arm support are respectively connected with the small arm back plate through fourth bolts; the small arm shell is connected with the small arm back plate through fifth bolts; the grading adjustment component is connected with the big arm component and the small arm component;

the wrist component comprises a first wrist joint motor, a second wrist joint motor, a first wrist motor shell, a second wrist motor shell, a first wrist supporting plate and a second wrist supporting plate; the first wrist joint motor is connected with the small arm back plate and the first wrist supporting plate, and the first wrist motor shell is fixed on the first wrist supporting plate through sixth bolts; the second wrist joint motor is connected with the first wrist supporting plate and the second wrist supporting plate, the second wrist motor shell is fixed on the second wrist supporting plate through seventh bolts, and the second wrist supporting plate is connected with the hand component;

the hand component comprises a palm pad and joint vibration components; the palm pad is provided with a hand binding band; each of the joint vibration component comprises a finger binding band, a microvibration unit and a plug; and the microvibration unit is fixed on the finger binding band and sealed through the plug.

2. The portable upper limb rehabilitation mechanical arm with the grading adjustment training function according to claim 1, wherein the relative rotation range of the big arm component and the small arm component is 0° to 180°.

3. The portable upper limb rehabilitation mechanical arm with the grading adjustment training function according to claim 1, wherein two fixed holes used for hanging the mechanical arm are formed in the upper portion of the big arm back plate.

4. The portable upper limb rehabilitation mechanical arm with the grading adjustment training function according to claim 1, wherein the big arm shell and the small arm shell are both hollow shells.

5. The portable upper limb rehabilitation mechanical arm with the grading adjustment training function according to claim 1, wherein the inner supporting rod is capable of being locked unidirectionally through the ratchet wheel, a square hole connected with the ratchet wheel is formed in an end of the inner supporting rod, and a pressing shrinkage structure is arranged at another end of the inner supporting rod.

6. The portable upper limb rehabilitation mechanical arm with the grading adjustment training function according to claim 1, wherein the outer supporting rod is in a hollow pipe shape, six pairs of fixed through holes which are evenly distributed are symmetrically formed in the side wall of the outer supporting rod, and an anti-skid sheath is arranged at the tail end of the outer supporting rod.

7. The portable upper limb rehabilitation mechanical arm with the grading adjustment training function according to claim 1, wherein grooves for accommodating the inner supporting rod and the outer supporting rod and mounting the reversing component are formed in the supporting base.

8. The portable upper limb rehabilitation mechanical arm with the grading adjustment training function according to claim 1, wherein the first big arm support, the second big arm support, the first small arm support, the second small arm support, the hand binding band and the finger binding band are all made of hook and loop fasteners.

9. The portable upper limb rehabilitation mechanical arm with the grading adjustment training function according to claim 1, wherein the surface of the elbow motor shell is provided with character identifiers for displaying gears where the adjusting knob is located.

* * * * *